United States Patent
Kakōu

Patent Number: 6,140,922
Date of Patent: Oct. 31, 2000

[54] SYSTEM FOR INDICATING LOCATIONS OF SALES ITEMS, METHOD THEREOF, AND APPARATUS THEREOF

[75] Inventor: Yuuichi Kakōu, Kanagawa, Japan

[73] Assignee: Fujitsu Limited, Kawasaki, Japan

[21] Appl. No.: 08/870,657

[22] Filed: Jun. 6, 1997

[30] Foreign Application Priority Data

Oct. 30, 1996 [JP] Japan ................................. 8-288143

[51] Int. Cl.[7] .................................................. G08B 13/14
[52] U.S. Cl. .................................. 340/568.1; 340/825.49; 340/825.27; 235/385; 364/478.02; 364/478.04
[58] Field of Search ..................... 340/825.49, 825.54, 340/825.27, 825.28, 825.35, 568.1; 235/385, 381; 705/28, 22; 364/478.02, 478.03, 478.04; 395/216, 222

[56] References Cited

U.S. PATENT DOCUMENTS

| | | | |
|---|---|---|---|
| 3,908,800 | 9/1975 | Drapeau | 340/568 |
| 3,946,220 | 3/1976 | Brobeck et al. | 235/168 |
| 4,346,453 | 8/1982 | Drapeau et al. | 364/900 |
| 4,570,223 | 2/1986 | Yoshimoto | 364/405 |
| 4,814,742 | 3/1989 | Morita et al. | 340/825.54 |
| 5,063,380 | 11/1991 | Wakura | 340/825.54 |
| 5,250,789 | 10/1993 | Johnsen | 235/383 |
| 5,534,851 | 7/1996 | Russek | 340/573.4 |
| 5,543,607 | 8/1996 | Watanabe et al. | 235/383 |
| 5,596,501 | 1/1997 | Comer et al. | 364/464.23 |
| 5,635,915 | 6/1997 | Gray | 340/825.35 |
| 5,666,493 | 9/1997 | Wojcik et al. | 705/26 |
| 5,689,238 | 11/1997 | Connon | 340/568 |
| 5,745,705 | 4/1998 | Iguchi | 395/221 |
| 5,875,434 | 2/1999 | Matsuoka et al. | 705/28 |

Primary Examiner—Daniel J. Wu
Assistant Examiner—Anh La
Attorney, Agent, or Firm—Staas & Halsey LLP

[57] ABSTRACT

Columns of sales item stock shelves in a drive-through type store are referred to as groups. Indicators are disposed on the columns of the shelves. Each of the indicators is composed of, for example, red and blue lamps. The red or blue lamp lights corresponding to a POS unit from which a store clerk has input a sales item code. The red or blue lamp represents the location of a sales item group that includes an ordered sales item of a customer. The store clerk collects the ordered sales item from the sales item group indicated with the color designated to the POS unit that the store clerk uses. The indicators are controlled by the POS unit. The POS unit searches for a sales item group that includes the ordered sales item corresponding to the input sales item code and causes the indicators to indicate the sales item group.

18 Claims, 9 Drawing Sheets

F I G. 1

```
ORDER SALES ITEM LIST                        1996. 9.17
                                                  13:30

(ITEM)        (QUANTITY)  (UNIT PRICE)     (AMOUNT)
ORANGE JUICE      4          107              428
SNACK FOOD        3          128              384
RICE-BALL         4          110              440
(AMOUNT)                                    1,252
CONSUMPTION TAX                                37

MAGAZINE          1          280              280
CIGARATTE         1          240              240
ORDERED TOTAL                              ¥1,809

****  THANK YOU  ****
- - - - - - - - - - - - - - - - - - - - - - - - - - -
CHANGE    ¥10,000:¥8,191   ¥5,000:¥3,191   ¥2,000:¥191
```

SYSTEM FOR INDICATING LOCATIONS OF SALES ITEMS, METHOD THEREOF, AND APPARATUS THEREOF

BACKGROUND OF THE INVENTION

1. Field of the Invention

The present invention relates to a system for allowing a store clerk to effectively locate a sales item corresponding to an order from a customer in a store having a POS (Point Of Sales) unit so as to increase the turnover of the store.

2. Description of the Related Art

Nowadays, as the use of cars becomes more common, drive-through type stores that provide customers in their cars with services are being developed.

In particular, during long distance driving, people often eat light meals in their cars. However, to buy food and drink, people should park their cars in front of convenience stores, get out of their cars, and buy the food and drink. Thus, the stores should have parking areas. However, normal convenience stores do not have large parking areas. If the parking area of a store from which a person wants to buy food and drink is full, he or she cannot buy from that store.

On the other hand, if people can shop in their cars, stores do not need to have large parking areas. Thus, people can stop at stores at any time convenient to themselves.

In the United States, which is often called a motor community, many facilities where people can shop or watch movies from their cars have been built and are being operated.

In the United States, although there are many drive-through type stores, the efficiency thereof is not very high.

In other words, conventionally, when a customer stops at a drive-through store, a store clerk takes an order from a customer, asks him or her about a budget, collects a sales item from a sales item stock shelf, and hands the customer the ordered sales item as well as their change for the purchase.

However, since it is supposed that most store clerks are inexperienced part-time workers, they may not precisely know the locations of sales items in their stores. Thus, they may take a long time to locate the ordered sales items. Consequently, they cannot promptly process orders from customers.

In addition, a display unit for customers does not have a function for allowing them to acknowledge in advance the ordered sales items and the amount of money to be paid.

SUMMARY OF THE INVENTION

An object of the present invention is to provide a system for indicating the locations of sales items so as to allow a store clerk to effectively collect sales items and promptly process orders from customers in drive-through type stores.

The present invention is a system for use in a store having a POS unit for inputting an order from a customer, comprising an indicator, disposed in a sales item stock location in which sales items are stocked, for indicating and displaying a location of a sales item ordered by the customer, in accordance with the indication from the POS unit disposed in the store.

In the present invention, the above-described system is applied to a drive-through type store.

In such a system, when a store clerk inputs a sales item code to a POS unit, the location of the sales item corresponding to the sales item code is indicated. Thus, the store clerk does not need to search for the sales item throughout the store.

In the case of a drive-through type store, although a customer does not need to enter the inside of the store, the store clerk who has received an order from the customer should search the sales item stock shelves throughout the store. The number of kinds of sales items stocked in stores may be as large as 2000 to 3000. In addition, since it is supposed that many store clerks are inexperienced part-time workers, it will take a long time to locate the ordered sales items. However, when the system according to the present invention is applied to drive-through type stores, since desired sales items can be promptly located, the store clerks do not need to search the sales item stock shelves throughout the a store. Thus, they can effectively collect the ordered sales items.

Consequently, since the time for which each store clerk deals with each customer can be shortened, the turnover of the stores is increased. As a result, the stores can be effectively managed.

DESCRIPTION OF PREFERRED EMBODIMENTS

Figure 1:
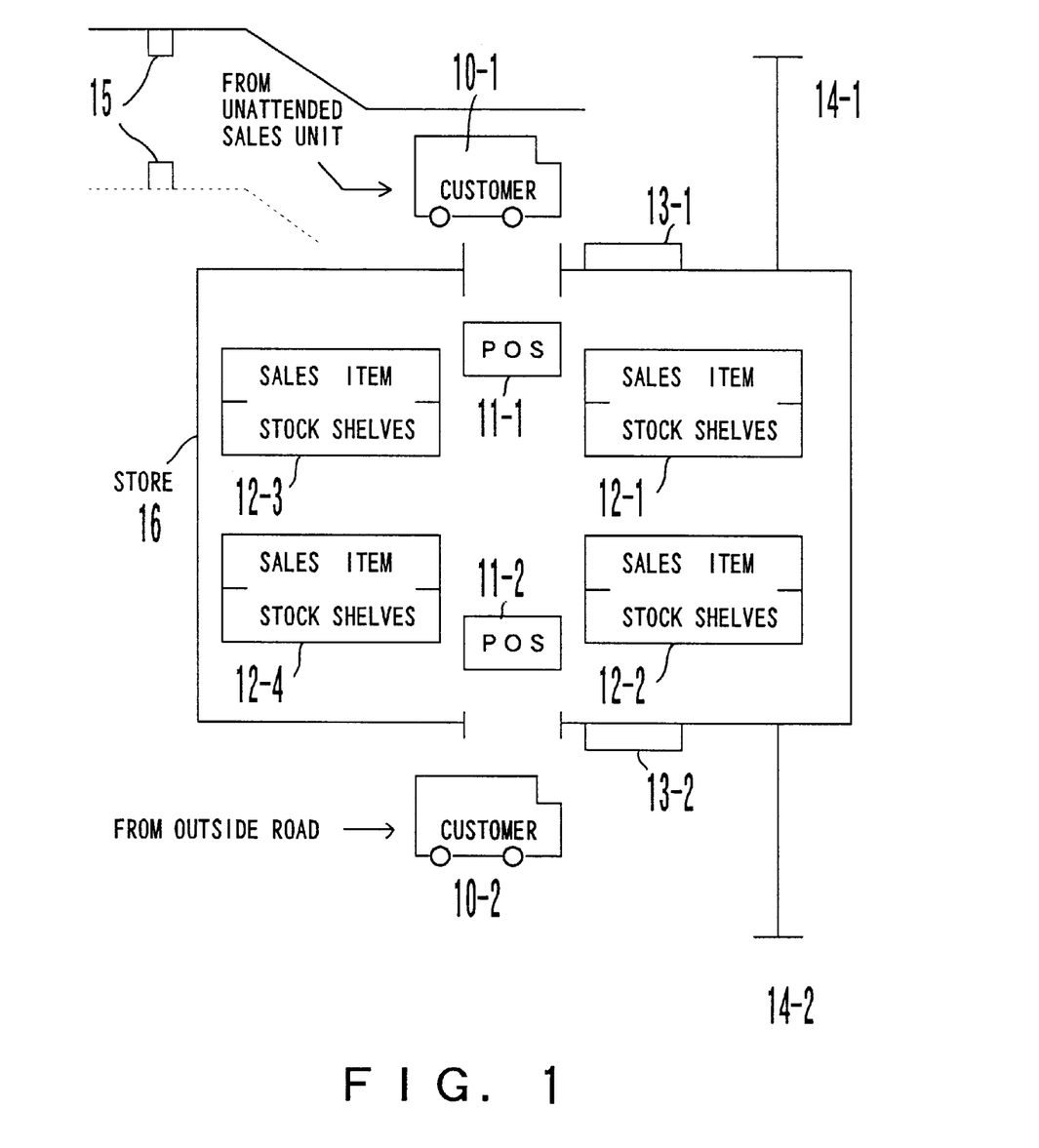
FIG. 1 is a schematic diagram for explaining a drive-through type store according to the present invention.

FIG. 1 is a schematic diagram for explaining a drive-through type store according to the present invention.

A store 16 has two sales windows. Store clerks deal with orders from customers 10-1 and 10-2 in their cars through these windows. In the way out from the store 16, there are car exit gates 14-1 and 14-2. After the customers 10-1 and 10-2 pay money for the ordered items to the store clerks of the store 16, the car exit gates 14-1 and 14-2 respectively are opened.

In the store 16, POS units 11-1 and 11-2 that the store clerks operate are disposed at the respective sales windows. When the store clerks take orders from the customers 10-1 and 10-2, the store clerks input the orders to the respective POS units 11-1 and 11-2. Thereafter, the POS units 11-1 and 11-2 output respective journals. At this point, indicators on the sales item stock shelves 12-1 to 12-4 indicate the approximate locations of the ordered sales items.

With reference to the journals output from the POS units 11-1 and 11-2, the store clerks go to the sales item stock shelves 12-1 to 12-4 so as to look for the ordered sales items. At this point, by going to the indicated approximate locations of the ordered sales items on the sales item stock shelves 12-1 to 12-4, the store clerks can effectively collect the ordered sales items from the sales item stock shelves 12-1 to 12-4.

At this point, electronic display boards 13-1 and 13-2 display the ordered sales items, the prices thereof, and the total amount thereof so that the customers can acknowledge their ordered sales items.

After the store clerks collect the ordered sales items, they return to their respective POSs 11-1, 11-2, receive money from the customers 10-1 and 10-2, and return any change to the customers with the ordered sales items. At this point, the car exit gates 14-1 and 14-2 are opened. Thereafter, the cars exit the store.

The drive-through type store according to the present invention may have an unattended sales unit, such as a self-service gasoline pump, an automatic car washer, etc. FIG. 1 shows the situation that the car of the customer 10-1 came from an unattended sales unit to the store 16. The unattended sales unit has a car sensor 15 so as to automatically determine whether the car passed through the unattended sales unit. Information of a sales item that the customer 10-1 bought at the unattended sales unit is automatically sent to the POS unit 11-1. The customer 10-1 pays for the sales item at the sales window of the POS unit 11-1.

Figure 2:
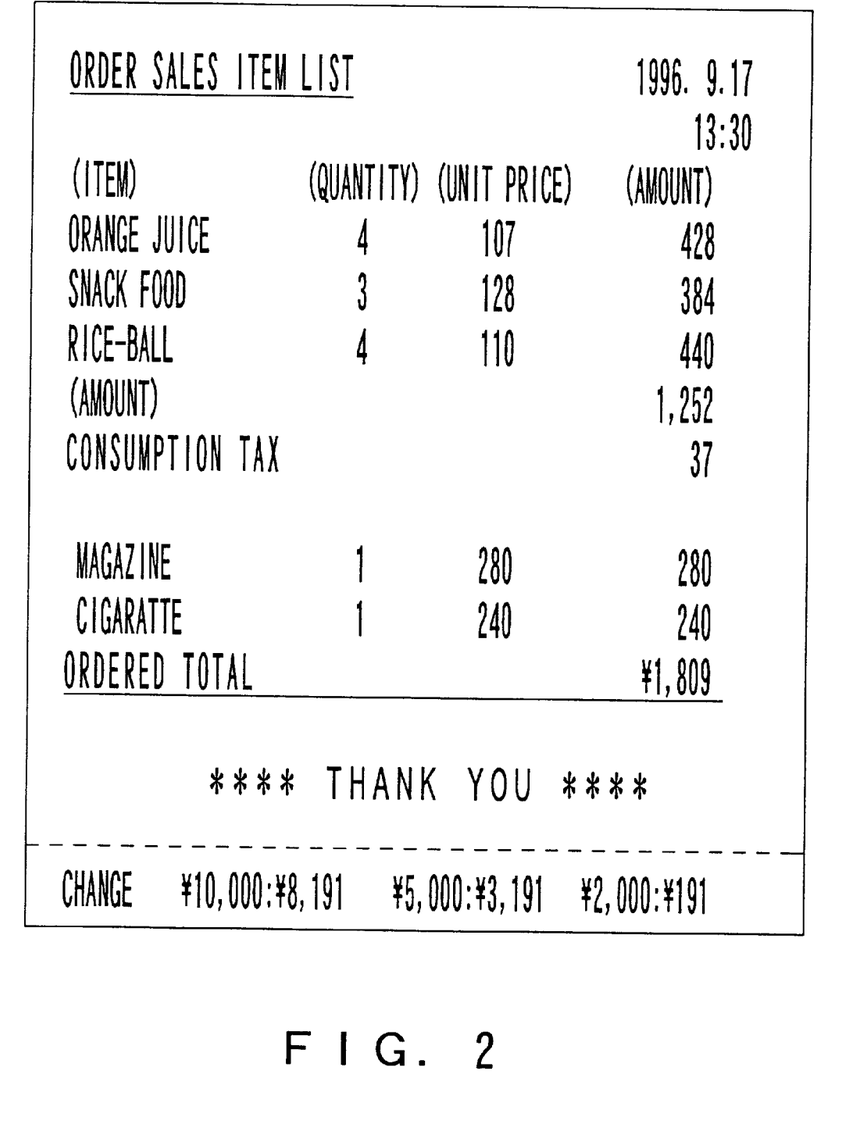
FIG. 2 is a schematic diagram showing an example of a display of an electronic display board.

FIG. 2 is a schematic diagram showing an example of a display on the electronic display board. In the example, a sales item list is displayed. The sales item list includes the ordered date (year, month, day), ordered time (hour, minute), sales items, quantities, unit prices, and amounts. Since orange juice, snack food, rice-ball, and so forth are stocked on sales item stock shelves, when the sub total is calculated, their approximate locations on the sales item stock shelves are indicated for the store clerk.

Since magazines and cigarettes are placed near the POS unit, the store clerk does not need to go to the sales item stock shelves. Thus, data of these sales items is directly input to the POS unit. Sales items are categorized depending on whether or not they include consumption tax. Consumption tax for sales items that do not include it in the unit price is separately calculated.

"Ordered total amount" is displayed when the store clerk presses the total button of the POS unit. As shown in the lower portion of the display of FIG. 2, the amount of change corresponding to each type of bill (for example, ¥10,000 bill, ¥5,000 bill, or ¥2,000 bill that the customer may pay with is displayed.

The customer in his or her car can acknowledge whether or not the ordered sales items have been correctly processed by referring to the electronic display board. Thereafter, the customer pays the store clerk and receives the ordered sales items and the change from the store clerk.

Figure 3:
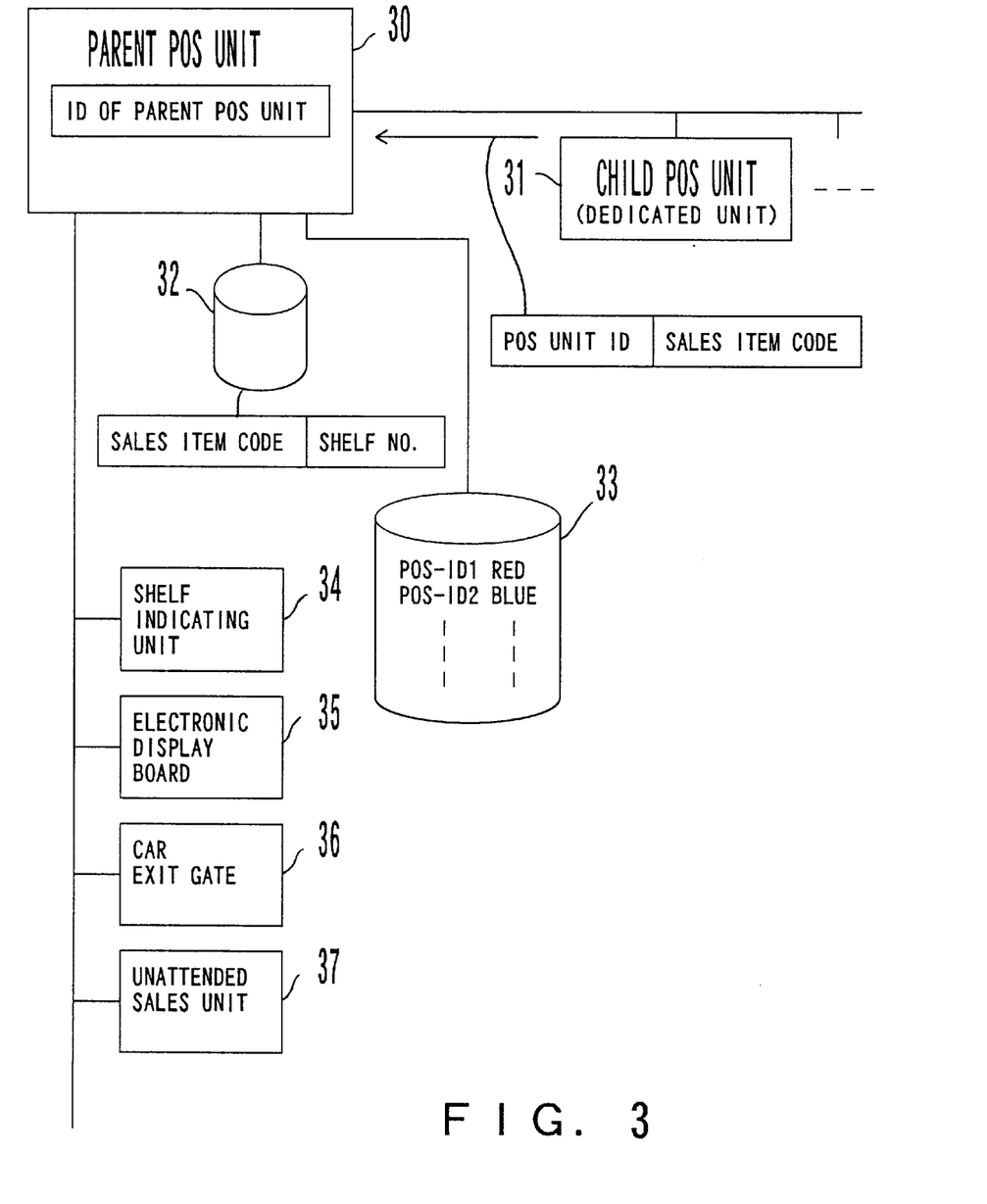
FIG. 3 is a block diagram showing the structure of a service system of the drive-through type store according to the present invention.

FIG. 3 is a block diagram showing the structure of a service system in a drive-through type store according to the present invention.

The store has, for example, two sales windows. The two sales windows have respective POS units. One of the two POS units is a parent POS unit 30 that functions as a server and controls the entire system of the store. The parent POS unit 30 has a function of a personal computer. In other words, the parent POS unit 30 may be a personal computer.

A child POS unit 31 is connected to the parent POS unit 30. The child POS unit 31 is a terminal unit that is dedicated for calculating amounts of money. In addition to the child POS unit 31, a shelf indicating unit 34, an electronic display board 35, a car exit gate 36, an unattended sales unit 37, and so forth, are connected to the parent POS unit 30. The parent POS unit 30 controls all these units.

The shelf indicating unit 34 is disposed on a sales item stock shelf. The shelf indicating unit 34 is used to indicate the approximate location of an ordered sales item. Further, with a plurality of colors, the shelf indicating unit 34 can indicate the approximate locations of sales items. Inputting by the parent POS unit 30 and inputting by the child POS unit 31 are identified with different colors. With reference to the indicated colors, the store clerks can easily locate the ordered sales items by the store clerk remembering which POS unit he/she used.

The parent POS unit 30 and the child POS unit 31 are respectively designated unique POS-IDs. When a sales item is input from a POS unit, the color of the indicator on a sales item stock shelf is designated corresponding to the POS-ID thereof. To do that, the parent POS unit 30 has a color indication file 33 that stores data in which POS-IDs and colors are correlated.

Sales item information sent from the child POS unit 31 is data composed of a POS-ID and a sales item code as shown in FIG. 3. The parent POS unit 30 identifies the POS-ID included in the data, reads the color to be indicated by the shelf indicating unit from the color indication file 33, and thereby displays the location of the sales item with the relevant color indicator.

In addition, the parent POS unit 30 has a shelf location file 32 that represents the locations of sales items on the sales item stock shelves. The shelf location file 32 stores data in which sales item codes and shelf numbers are correlated. By referring to the shelf location file 32, the parent POS unit 30 obtains the location of a sales item on the sales item stock shelves and informs the store clerk of the location with the shelf indicating unit.

As described above, the parent POS unit 30 has a unique POS-ID. A sales item code is input from the parent POS unit 30, which is recognized corresponding to the POS-ID thereof. A color to be indicated for the sales item is obtained from the color indication file 33. In addition, the location of the sales item on the sales item stock shelves is obtained from the shelf location file 32. The sales item is then indicated with a lamp in a location and color set according to the obtained location and color data.

The shelf location file 32 shown in FIG. 3 stores data in which only sales item codes and shelf numbers are correlated. On the other hand, the parent POS unit 30 stores information of sales item names and prices corresponding to the sales item codes. Thus, the shelf location file 32 may be a sales item file that stores data in which sales item codes, shelf numbers, sales item names, prices, and so forth are correlated.

Figure 4:
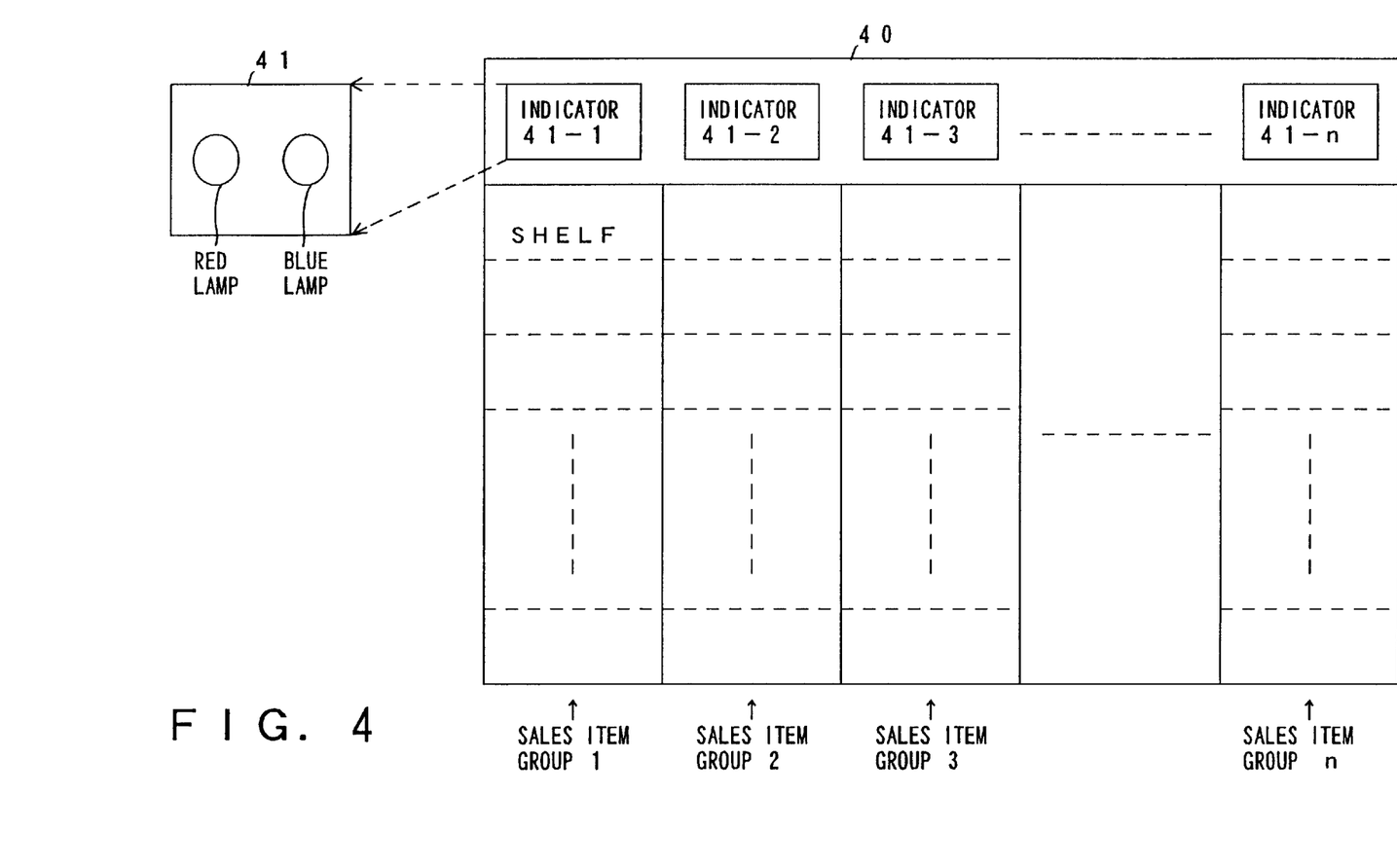
FIG. 4 is a schematic diagram showing an example of the structure of sales item stock shelves and indicators thereof according to an embodiment of the present invention.

FIG. 4 is a schematic diagram showing an example of the structure of a sales item stock shelf and an indicator thereof according to an embodiment of the present invention.

Generally, normal drive-through type stores may have as many as 2000 to 3000 kinds of sales items. However, as it is not practical to indicate the individual locations of all of these sales items, as shown in FIG. 4, sales item stock shelves 40 are divided into a plurality of shelf groups as sales item groups. The indicators indicate the sales item groups that include the desired sales items.

In FIG. 4, sales item groups 1 to n correspond to rows of the sales item stock shelves. The sales item groups have respective indicators 41-1 to 41-n. Each of the indicators 41-1 to 41-n has a red lamp and a blue lamp as an indicator unit 41, as shown at the left of FIG. 4.

For example, location data that is input from the parent POS 30 is indicated in red, whereas location data that is input from the child POS 31 is indicated in blue. The store clerk can identify the location of an ordered sales item corresponding to the color representing the POS unit that he or she uses. The store clerk looks for the specific ordered sales item among the sales item groups that the indicators 41-1 to 41-n indicate.

Thus, the store clerk locates the several sales item groups that the indicators 41-1 to 41-n indicate in the color corresponding to the POS unit that he or she uses, collects the specific ordered sales items from the indicated sales item groups, goes back to the sales window, and uses the POS unit to calculate the amount of money for the ordered sales items, etc. Thus, even if the store clerk is an inexperienced part-time worker, he or she can effectively locate the specific ordered sales items on the sales item stock shelves. Consequently, the work efficiency is improved and sales services can be provided promptly to the customers.

The lamps of the indicator 41 are not limited to such as long as they are suitable visual indicators. In addition, the colors of the lamps are not limited to red and blue, as long as the store clerks can distinguish which POS unit is being referred to.

The user who uses the system according to the present invention can freely categorize around 2000 to 3000 kinds of sales items in a store into sales item groups. For example, when sales items of the same kind (for example, candies from different makers) are categorized as the same sales item group, it will take time to look for a sales item from a particular maker in the sales item group. For example, when sales items from different makers are categorized as different sales item groups, the maker of a caramel indicated by the indicator 41-1 is different from the maker of a caramel indicated by the indicator 41-3. Thus, the store clerk can easily find a sales item from a maker that a customer has ordered.

In contrast, when sales items of different kinds are placed in columns on the sales item stock shelves 40, even if the number of the indicators 41-1 to 41-n is small, the locations of individual sales items can be substantially indicated. Of course, the indicators 41-1 to 41-n may be disposed on a side portion of the sales item stock shelves 40 so as to indicate the different rows of shelves. In this case, it is preferred to place sales items of different kinds in the same rows of the shelves.

Figure 5:
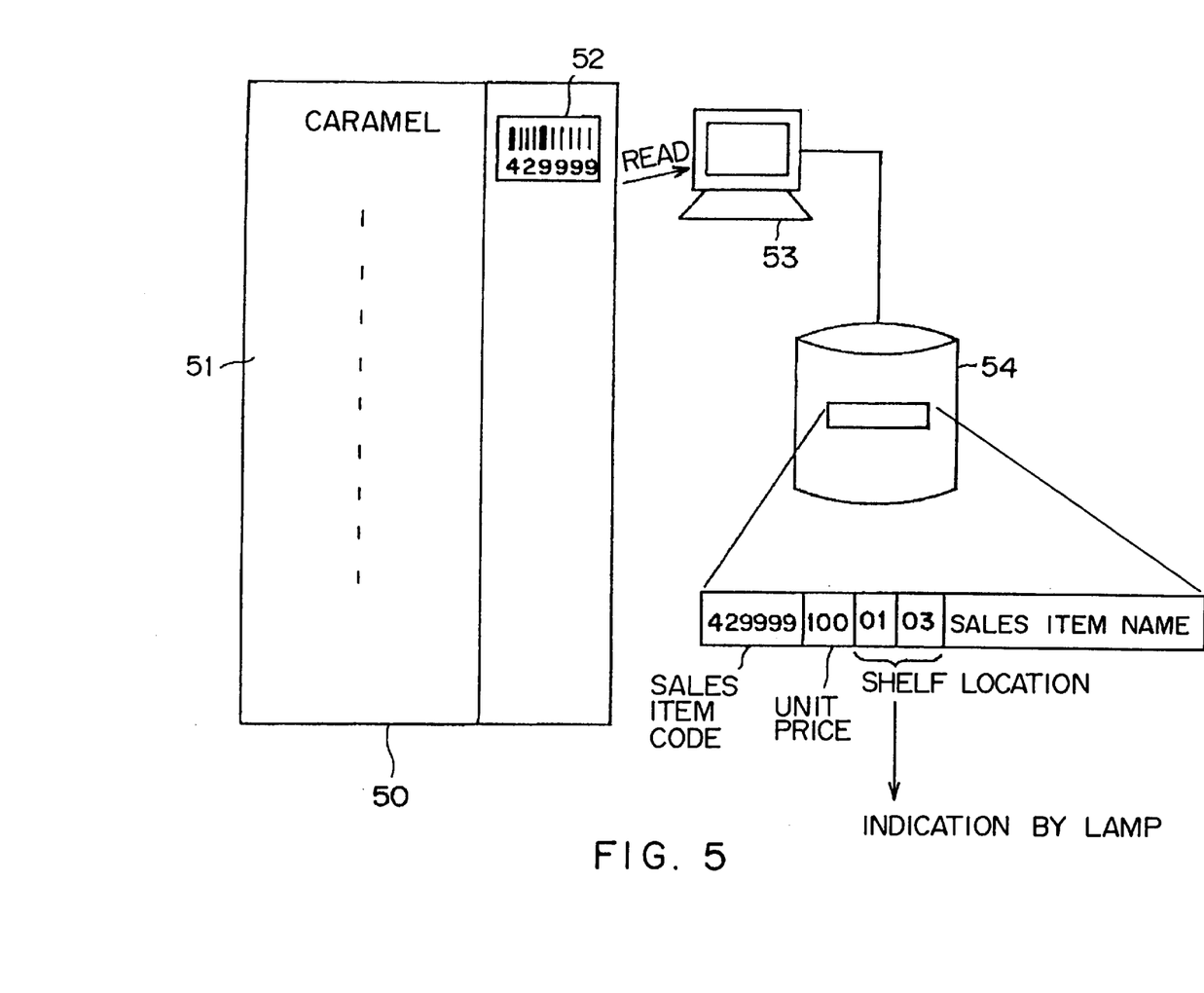
FIG. 5 is a schematic diagram showing an example of an input method of a sales item code to a POS unit.

FIG. 5 is a schematic diagram showing an example of an input method of a sales item code to a POS unit. A sales item code is input to a POS unit 53 with, for example, an electric order book (EOB) 50. The EOB 50 lists sales item names and sales item codes 52 as bar codes, in the form of a sales item list 51.

By referring to the EOB 50 for the sales code 52 corresponding to an order from a customer, the store clerk uses a bar code reader (not shown) to read the sales item code to the POS unit 53. As shown in FIG. 5, the POS unit 53 has a sales item file 54. The sales item file 54 is composed of the shelf location file 32 shown in FIG. 3, and other information such N as prices of sales items and so forth.

Data stored in the sales item file 54 is not limited to the format shown in FIG. 5. In FIG. 5, the sales item file 54 stores data in which, for example, sales item codes, sales item names, unit prices, and shelf locations are correlated. The shelf locations are represented by two numbers. In this example, it is assumed that the number of shelves is small. In FIG. 5, the shelf location "01" "03" represents the third shelf in the first row.

In the example shown in FIG. 4, since there were many shelves and many kinds of sales items, a method for indicating the shelf locations as sales item groups was explained. However, when the number of shelves is small, indicators can be disposed on individual shelves. The data format of the sales item file 54 shown in FIG. 5 represents the locations of the individual shelves, so as to indicate the locations of individual sales items.

Thus, when the sales item code 52 is input, the POS unit 53 references the sales item file 54 and obtains the sales item name, the unit price, and the shelf location. Thereafter, the POS unit 53 outputs the sales item name and the unit price to the journal and the electronic display board. The shelf location data is used to indicate the shelf location with a suitable lamp so that the store clerk can easily locate the ordered sales item on the sales item stock shelves.

Of course, sales item codes can be input to the POS unit 53 by other than the above-described method. In other words, sales item names can be directly input to the POS unit 53. In this case, although the data in the sales item file 54 need not include sales item codes, when sales items are received from a supplier or the like, they may be processed with the sales item codes. Thus, it is preferred to register sales item codes.

Figure 6:
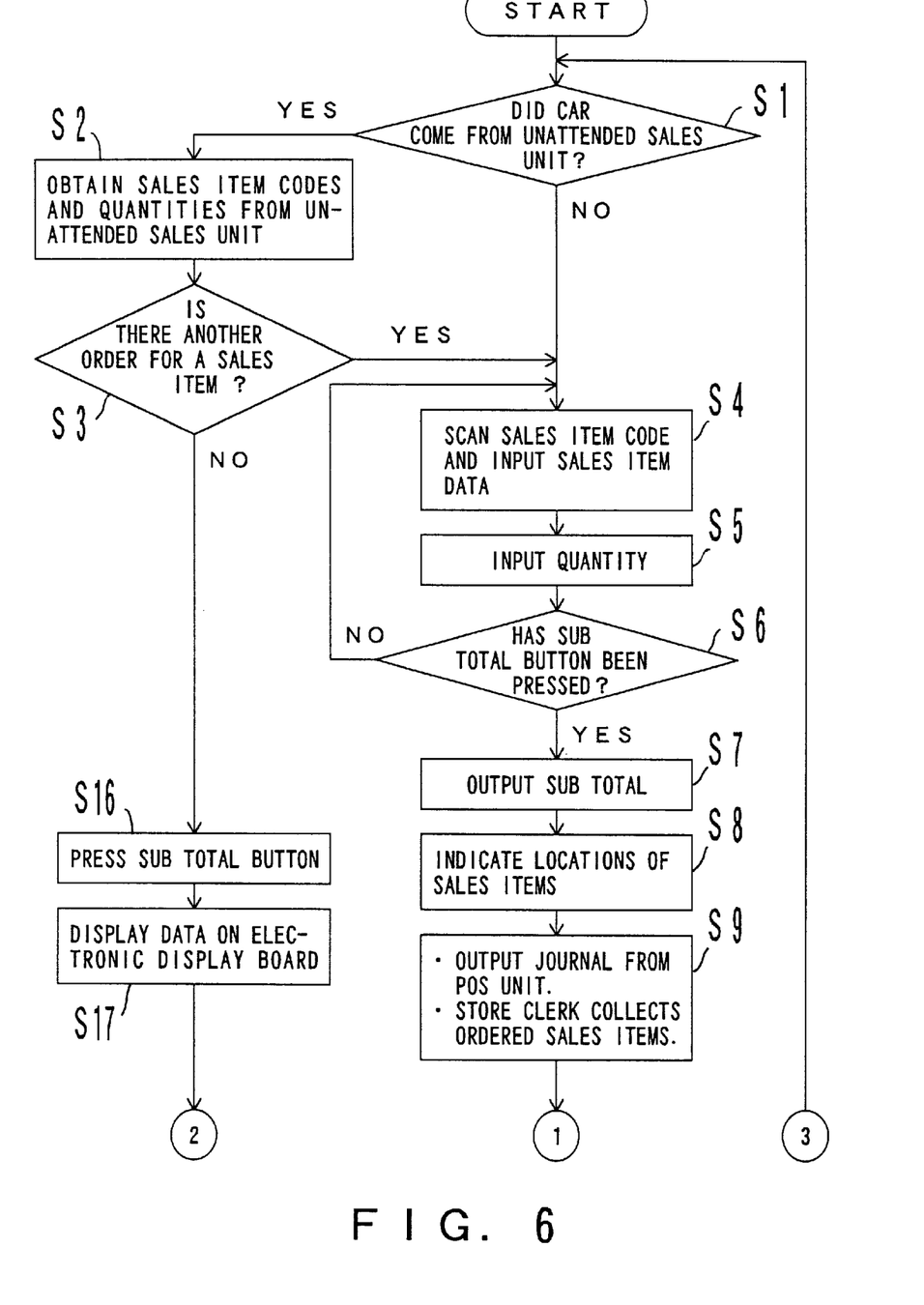
FIG. 6 is a flow chart showing a process of a service in a drive-through type store (No. 1)
Figure 7:
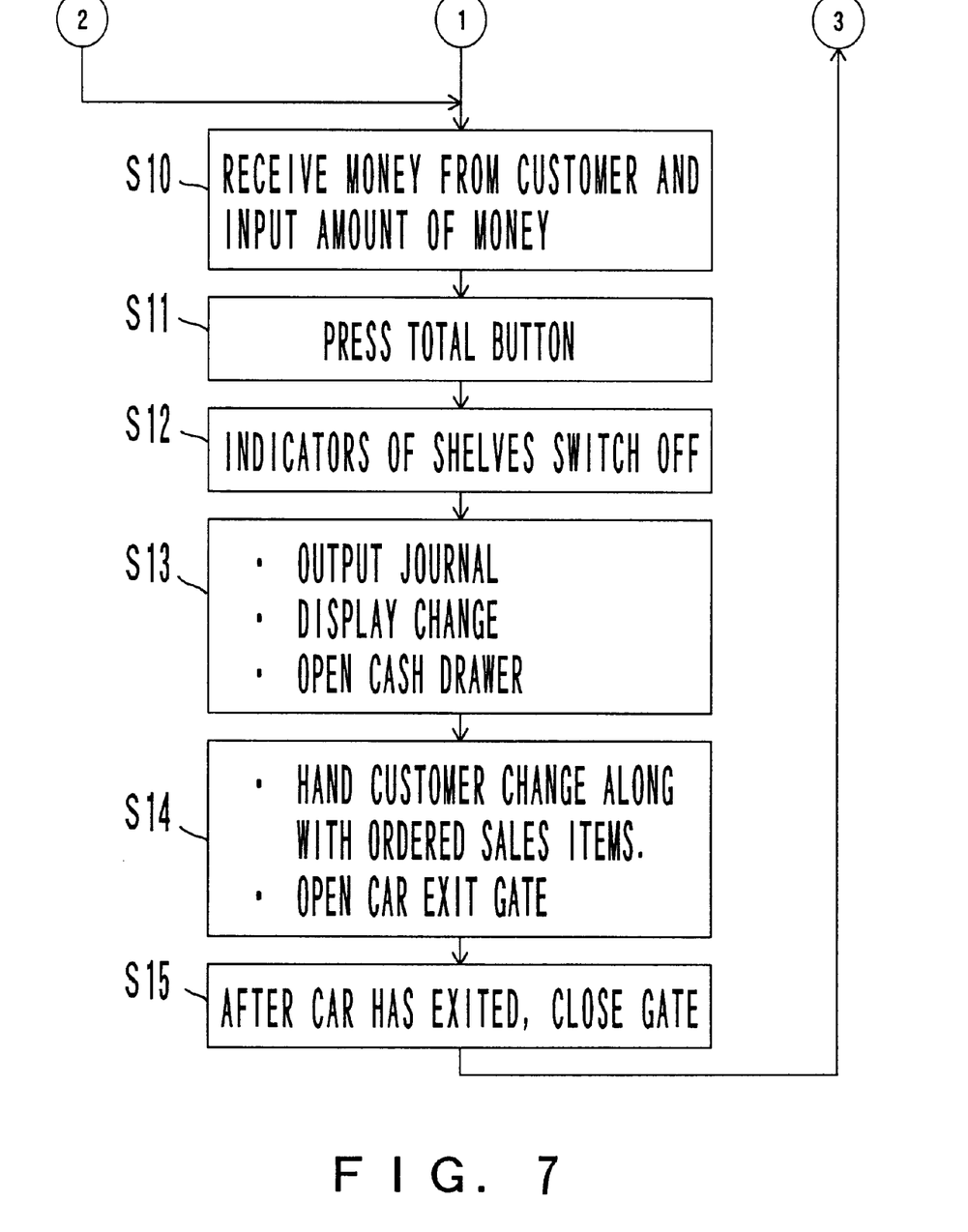
FIG. 7 is a flow chart showing the process of the service in the drive-through type store (No. 2)

FIGS. 6 and 7 are flow charts showing a service process in a drive-through type store.

When a car comes to a sales window of the drive-through type store, it is determined whether or not the car came from an unattended sales unit such as a gasoline pump or a car washer (at step S1). The determination of whether or not the car came to the sales window from the unattended sales unit can be accomplished in many ways. For example, a sales window that a car can approach from the unattended sales unit may be restricted. Alternatively, when a customer bought a sales item at the unattended sales unit, a card is issued that represents the sales at the unattended sales unit. The customer hands this card to a store clerk at the sales window.

When the car comes to the sales window from the unattended sales unit, data such as a sales item code and a quantity thereof bought at the unattended sales unit is sent to the POS unit (at step S2). The store clerk asks if the customer wants to place another order (at step S3). When the customer does not order another sales item, the store clerk calculates the amount of money for the sales item bought at the unattended sales unit (as will be described later). When the customer orders another sales item, the store clerk takes the additional order, scans the sales item code with the above-described EOB or the like, and inputs the relevant data to the POS unit (at step S4). After the store clerk has input the sales item, he or she inputs the quantity thereof (at step S5). Thereafter, the POS unit determines whether or not the sub total button has been pressed (at step S6). When the determined result at step S6 is No, since there is another sales item to be input, the flow returns to step S4. At step S4, the store clerk inputs another sales item code and the quantity thereof. After the store clerk has input all the ordered sales items, he or she presses the sub total button to cause the POS unit to output the sub total (at step S7).

At this point, the names, the prices, the quantities, the sub total, and so forth of the ordered sales items are displayed on the electronic display board disposed in front of the customer's car. In addition, the locations of the sales items on the sales item stock shelves in the store are indicated (at step S8).

When the POS unit outputs the journal, the store clerk goes to the sales item stock shelves in the store and collects the ordered sales item with reference to the journal (at step S9). After the store clerk has collected all the ordered sales items, he or she returns to the sales window, receives the money from the customer, and inputs the amount of the received money (at step S10). Alternatively, before step S7, when the ordered sales items are placed next to the POS unit (this case is not shown in FIGS. 6 and 7), the store clerk inputs the codes, the prices, the quantities, and so forth of the ordered sales items to the POS unit, presses the sub total button, and then causes the electronic display board to display such data. Thereafter, the store clerk receives the money for the ordered sales items from the customer.

When the store clerk has received the money from the customer at step S10, the store clerk presses the total button (at step S11).

When the store clerk has pressed the total button, the lamps indicating the locations of the sales items on the sales items stock shelves are switched off (at step S12). Thus, a journal that represents the final sales items is output. In addition, the amount of change is displayed on the electronic display board. The cash drawer of the POS unit is opened (at step S13). The store clerk takes the required change from the cash drawer of the POS unit and hands the customer the change along with the ordered sales items. At this point, the car exit gate is opened and the customer drives the car to an outside road (at step S14). Thereafter, the car exit gate is closed (at step S15). The store clerk waits for the next customer, and the flow returns to step S1.

When the determined result at step S3 is No (namely, the customer does not order another sales item), the store clerk presses the sub total button (at step S16). Thus, the amount of money for the goods bought at the unattended sales unit is displayed on the electronic display board (at step S17). The customer pays the money to the store clerk with reference to the electronic display board. The store clerk inputs the amount of money that he or she has received to the POS unit (at step S10).

In this case, since the customer only bought a sales item at the unattended sales unit, the indicators on the sales item stock shelves in the store are not used.

The store clerk receives the money, inputs the amount of money that he or she has received to the POS unit, and presses the total button (at step S11) so as to output the journal, display the amount of change, and open the cash drawer of the POS unit. At this point, step S12 is omitted since the indicators locations of the sales items on the sales item stock shelves have not been used.

The journal is output and the amount of change is displayed corresponding to the sales item codes and the quantities thereof received from the unattended sales unit to the POS unit at step S2. Thereafter, as was described previously, the store clerk hands the customer the change and opens the car exit gate so as to allow the car of the customer to go to the outside road (at step S14). After the car has exited the car exit gate, the store clerk closes the car exit gate (at step S15) and waits for the next customer.

Figure 8:
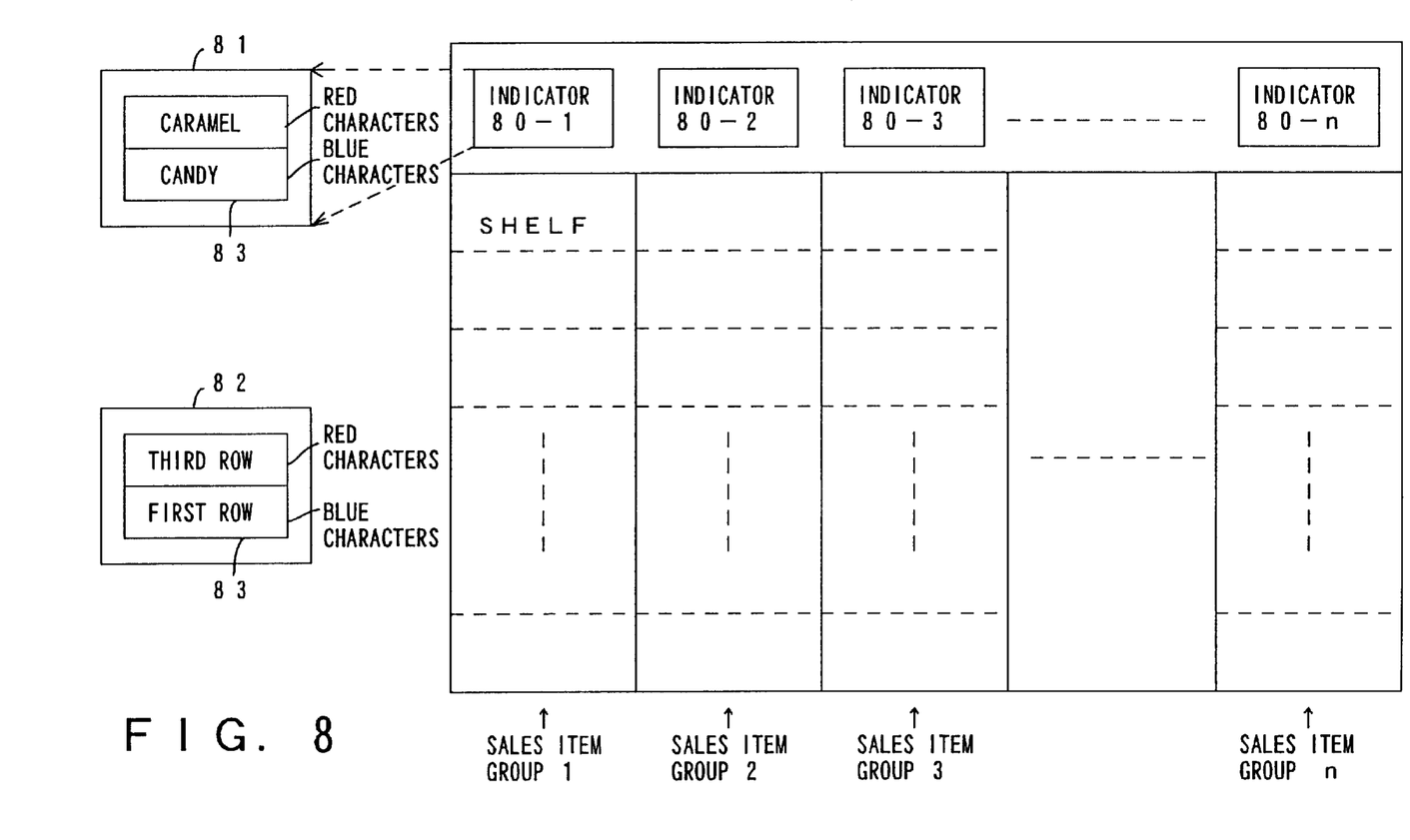
FIG. 8 is a schematic diagram showing an example of the structure of sales item stock shelves and indicators thereof according to a further embodiment of the present invention.

FIG. 8 is a schematic diagram showing an example of the structure of a sales item stock shelf and an indicator thereof according to another embodiment of the present invention.

The structure of the sales item stock shelves shown in FIG. 8 is the same as the structure of the sales item stock shelves shown in FIG. 4. Columns of the shelves are referred to as groups. Sales items in each group are referred to as a sales item group. Indicators 80-1 to 80-n are disposed on the individual columns of the sales item stock shelves.

In the example shown in FIG. 4, a red lamp or a blue lamp are lit. However, in the embodiment shown in FIG. 8, a liquid crystal display is provided, which can display characters, thereby information of sales items can be displayed in detail.

For example, in the example of the indicator 81, sales item names are output to a liquid crystal display screen 83. To distinguish which POS unit the data was received from, as with the embodiment shown in FIG. 4, the data is displayed in either red or blue characters. However, as long as a data source can be distinguished, any colors can be used.

A sales item name to be displayed is obtained from the sales item file in the POS unit corresponding to the sales item code thereof. The data received from the POS unit is displayed on the liquid crystal display screen 83.

Thus, the store clerk can easily distinguish the ordered sales items in each sales item group. In other words, to collect sales items with reference to a journal, the store clerk should recognize the sales items that he or she has yet to collect. Since the indicator 81 displays the ordered sales item names, the store clerk can clearly identity the ordered sales items to be collected from the displayed sales item groups. Thus, it is expected that the work efficiency of the store clerk can be improved.

An indicator 82 is another example of the indicators 80-1 to 80-n. In this example, the indicator 82 shows the shelf number instead of sales item name. To do that, the shelf location as sales item information from the POS unit should represent not only a sales item group, but a shelf number within the sales item group. With the shelf number displayed, the store clerk can easily distinguish the location of the shelf on which the ordered sales item is placed. There is no need for the store clerk to locate sales items from columns of the shelves to which the sales item group corresponds. Thus, it can be expected that the work efficiency of the store worker is improved.

The contents of data on the indicators 80-1 to 80-n can be varied corresponding to the location information of the sales items as stored in the POS unit. The greater the detail with which the locations of sales items are indicated, the more effectively inexperienced part-time store clerks can work.

In the case when the locations of the sales items are indicated in detail, when they are received from a supplier or the like before the store is open, the appropriate sales items should be correctly placed in the predetermined locations.

Figure 9:
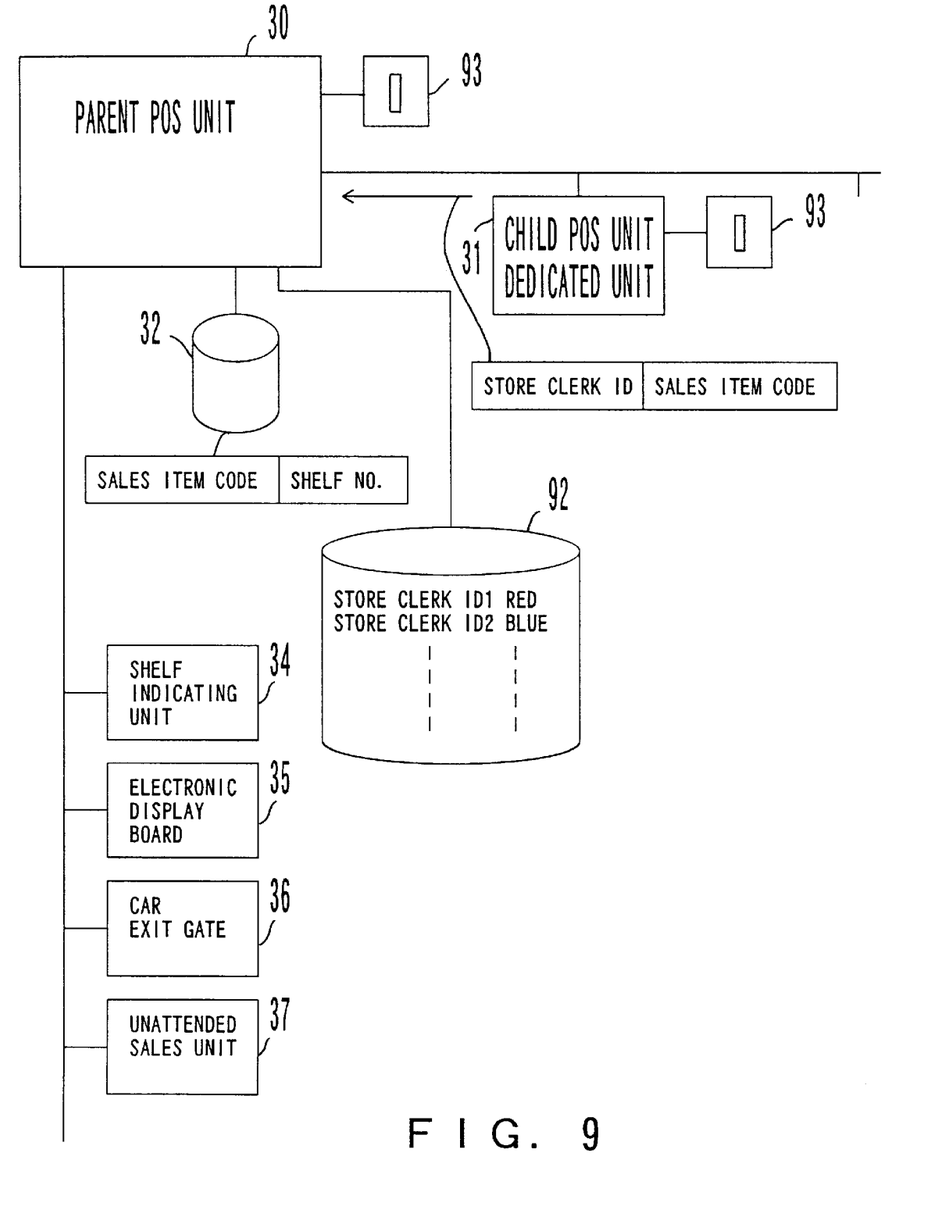
FIG. 9 is a block diagram showing the structure of a system for designating display colors of sales item stock shelves using a further method.

FIG. 9 is a block diagram showing the structure of a system for designating display colors of sales item stock shelves using another method.

In the system shown in FIG. 9, a parent POS unit 30 is disposed. A child POS unit 31 is connected to the parent POS unit 30. A shelf indicating unit 34 (that is disposed on a sales item stock shelf), an electronic display board 35, a car exit gate 36, and an unattended sales unit 37, are connected to the parent POS unit 30. The parent POS unit 30 controls these units. The parent POS unit 30 has a shelf location file 32 that stores sales item codes and shelf location data thereof (in particular, shelf numbers).

In the system shown in FIG. 3, each POS unit is designated a unique identification color. Depending on the POS unit that a store clerk uses, he or she collects ordered sales items with reference to the identification color of his/her POS unit, as indicated on the sales item stock shelves. However, in the system shown in FIG. 9, each store clerk is designated a unique color. Thus, each store clerk can collect ordered sales items with reference to his/her designated identification color, as indicated on the sales item stock shelves.

In other words, each store clerk is designated a unique ID and has an ID card or the like. The parent POS unit 30 or the child POS unit 31 has a card reader 93. Before each store clerk inputs data to a POS unit, he or she causes the card reader 93 to read his/her ID card and send the identification data to the POS unit. Data sent from the child POS unit 31 to the parent POS unit 30 is composed of a store clerk ID code and a sales item code.

The parent POS unit 30 has a color indication file 92 that stores data in which store clerk IDs and colors are correlated. The color of the indication on the sales item stock shelves is varied corresponding to the ID of the store clerk who has input the sales code. The store clerk identifies the color designated to him or her, looks for the ordered sales items indicated with this color on the sales item stock shelves, and collects the ordered sales items.

Such a system is effective when a number of store clerks are designated to one POS unit. In other words, in the case that individual POS units are designated unique identification colors, when two or more store clerks use the same POS unit, shelves are indicated by the same color. Thus, the number of customers that can be handled at one time is limited to the number of POS units.

On the other hand, when store clerks are respectively designated unique colors and the shelves are indicated with colors corresponding to the clerks, even if the number of POS units is small, a number of customers corresponding to the number of store clerks can be handled at one time. Thus, the turnover of the store can be improved.

In the above description, the system according to the present invention is applied to a drive-through type store. However, the present invention can be also applied to any store that has a POS unit for inputting orders from customers.

In addition, in the above description, it was assumed that sales items are placed on sales item stock shelves. However, the place in which sales items are stocked is not limited to shelves. It is preferred that the indicators should be disposed so that the locations of sales items are properly indicated corresponding to the place in which they are stocked.

In a store that has a POS unit for inputting orders from customers, even an inexperienced part-time store clerk can effectively locate the ordered sales items and promptly handle the requests of the customers. Thus, the turnover of the store can be improved.

What is claimed is:

1. A system for use in a store having a POS unit for inputting an order from a customer, comprising:

storage means for storing locations of sales items corresponding to the sales items input from the POS unit;

retrieving means for receiving the sales item in the order from the customer and retrieving a location of an sales item ordered by the customer from the locations stored in said storage means;

processor means for calculating a total amount of money for the sales items ordered by the customer; and an indicator, disposed in a sales item stock location in which sales items are stocked, for indicating and displaying the location of the sales item ordered by the customer, thereby the total amount of money is calculated automatically and the location of the sales item ordered by the customer is indicated automatically based on the sales item input from the POS unit, and wherein said indicator displays one of a plurality of different indicators that is uniquely assigned to the POS unit or to a store clerk inputting the customer order.

2. The system as set forth in claim 1, wherein a plurality of POS units are disposed in the store, and wherein said indicator indicates and displays colors corresponding to data received from the respective POS units.

3. The system as set forth in claim 2, wherein said indicators indicate and display sales item names as well as locations of sales items.

4. The system as set forth in claim 1, wherein sales items stocked in the sales item stock location are categorized into a plurality of sales item groups, and wherein said indicator indicates the location of a sales item group that includes a sales item ordered by the customer.

5. The system as set forth in claim 1, wherein the store has a sales displaying unit for displaying at least a sales item name, a price thereof, a quantity thereof, and a total amount of money thereof of a customer's order.

6. The system as set forth in claim 1, wherein individual store clerks of the store are respectively designated unique IDs and wherein when each store clerk inputs the designated ID to the POS unit, a color for a sales item code that the store clerk has input is designated.

7. A system for use in a drive through type store that has a POS unit for inputting an order from a customer, comprising:

storage means for storing locations of sales items corresponding to the sales items input from the POS unit;

retrieving means for receiving the sales item in the order from the customer and retrieving a location of an sales item ordered by the customer from the locations stored in said storage means;

processor means for calculating a total amount of money for the sales items ordered by the customer; and an indicator, disposed in a sales item stock location in a store, in which sales items are stocked, for indicating and displaying the location of the sales item ordered by the customer, thereby the total amount of money is calculated automatically and the location of the sales item ordered by the customer is indicated automatically based on the sales item input from the POS unit, and wherein said indicator displays one of a plurality of different indicators that is uniquely assigned to the POS unit or to a store clerk inputting the customer order.

8. The system as set forth in claim 7, wherein the drive-through type store has a car exit gate for preventing a car of the customer from exiting the store and wherein after a sales process is completed, said car exit gate can be opened.

9. The system as set forth in claim 7, wherein the drive-through type store has an unattended sales unit and wherein a sale performed by a store clerk and a sale performed by said unattended sales unit are calculated together.

10. A method for indicating the location of a sales item in a store for selling a sales item corresponding to an order from a customer, comprising the steps of:

storing locations of sales items corresponding to the sales items;

receiving at a POS unit the sales item in the order from the customer;

retrieving a location of an sales item ordered by the customer from the locations stored in the storing step;

calculating a total amount of money for the sales items ordered by the customer;

indicating and displaying the location of the sales item ordered by the customer at a sales item stock location disposed in the store in which sales items are stocked; and displaying at the sales item stock location one of a plurality of different indicators that is uniquely assigned to the POS unit or to a store clerk inputting the customer order, thereby the total amount of money is calculated automatically and the location of the sales item ordered by the customer is indicated automatically based on the sales item.

11. An apparatus, disposed in a store, for inputting an order from a customer, coupled to storage means for storing locations of sales items corresponding to sales items and connected to an indicator, disposed in a sales item stock location in the store in which sales items are stocked, for indicating and displaying a location of a sales item ordered by the customer, comprising:

retrieving means for receiving the sales item in the order from the customer and retrieving the location of the sales item ordered by the customer from the locations stored in the storage means; and processor means for calculating a total amount of money for the sales items ordered by the customer, and wherein said indicator displays one of a plurality of different indicators that is uniquely assigned to the POS unit or to a store clerk inputting the customer order.

12. The apparatus as set forth in claim 11, wherein the store has a plurality of the apparatuses, and wherein each of the apparatuses sends data to said indicator, the data causing the location of a sales item to be indicated and displayed in colors corresponding to the respective apparatuses.

13. The apparatus as set forth in claim 11, wherein the apparatus reads an ID of a store clerk and sends a command to said indicator, the command causing the location of a sales item to be indicated and displayed with colors designated to the individual store clerks.

14. A system having a POS unit for inputting an order from a user, comprising:

a storage unit storing locations of sales items corresponding to the sales items input form the POS unit;

a retrieving unit receiving the sales item in the order form the user and retrieving a location of the sales item ordered by the user from the locations stored in the storage unit;

a processor unit calculating a total amount of money for the sales items ordered by the user; and an indicator, disposed in a sales item stock, location in which sales items are stocked, indicating and displaying the location of the sales item ordered by the user, thereby the total amount of money is calculated automatically and the location of the sales item ordered by the user is indicated automatically based on the sales item input from the POS unit, and wherein said indicator displays one of a plurality of different indicators that is uniquely assigned to the POS unit or to a store clerk inputting the customer order.

15. A method for indicating the location of a sales item in a store, comprising the steps of:

receiving at a POS unit the sales item in an order from a customer;

indicating the location of the sales item ordered by the customer at a sales item stock location disposed in the store; and displaying at the sales item stock location one of a plurality of different indicators that is uniquely assigned to the POS unit receiving the order.

16. A method for indicating the location of a sales item in a store, comprising the steps of:

inputting at a POS unit the sales item in an order from a customer;

indicating the location of the sales item ordered by the customer at a sales item stock location disposed in the store; and displaying at the sales item stock location one of a plurality of different indicators that is uniquely assigned to a store clerk inputting the customer order.

17. A system for use in a store having a POS unit for inputting an order from a customer, comprising:

storage device storing locations of sales items corresponding to the sales items input from the POS unit;

retrieval device receiving the sales item in the order from the customer and retrieving a location of an sales item ordered by the customer from the locations stored in said storage device; and an indicator, disposed in a sales item stock location in which sales items are stocked, for indicating and displaying the location of the sales item ordered by the customer, wherein said indicator displays one of a plurality of different indicators that is uniquely assigned to the POS unit.

18. A system for use in a store having a POS unit for inputting an order from a customer, comprising:

storage device storing locations of sales items corresponding to the sales items input from the POS unit;

retrieval device receiving the sales item in the order from the customer and retrieving a location of an sales item ordered by the customer from the locations stored in said storage device; and an indicator, disposed in a sales item stock location in which sales items are stocked, for indicating and displaying the location of the sales item ordered by the customer, wherein said indicator displays one of a plurality of different indicators that is uniquely assigned to a store clerk inputting the customer order.

* * * * *